Oct. 19, 1926. M. McARDLE Re. 16,442

STAND AND CONTAINER FOR ELECTRIC IRONS

Original Filed Jan. 19, 1924 2 Sheets-Sheet 1

Witness.
N. M. McKnight

Inventor.
Michael W. McArdle.
by Burton and Burton
his Attorneys.

Oct. 19, 1926. M. McARDLE Re. 16,442
STAND AND CONTAINER FOR ELECTRIC IRONS
Original Filed Jan. 19, 1924 2 Sheets-Sheet 2
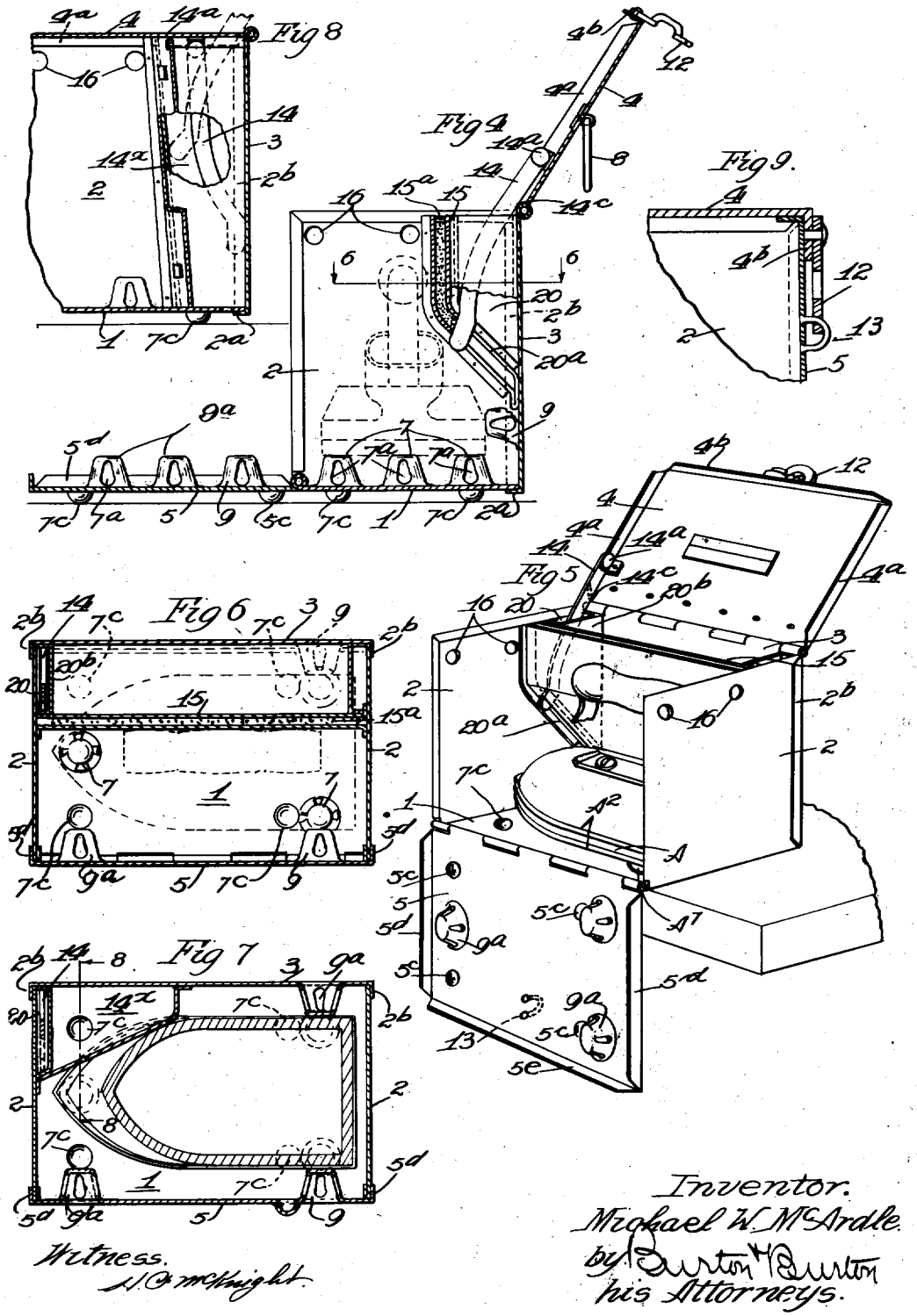
Witness.
N. C. McKnight.
Inventor.
Michael W. McArdle.
by Burton & Burton
his Attorneys.

Reissued Oct. 19, 1926.

Re. 16,442

UNITED STATES PATENT OFFICE.

MICHAEL W. McARDLE, OF CHICAGO, ILLINOIS.

STAND AND CONTAINER FOR ELECTRIC IRONS.

Original application filed January 19, 1924, Serial No. 687,181. Continued and application filed March 24, 1924, Serial No. 701,319½. Original No. 1,566,893, dated December 22, 1925. Application for reissue filed September 11, 1926. Serial No. 134,901.

This application is designed as a continuation of my application Serial No. 687,181, filed Jan. 19, 1924.

The purpose of the present invention is to provide an improved construction of the nature of a case or container for an electric iron adapted for containing the iron together with its electric cable packed therein for shipment and also adapted to serve as a container for the iron when out of service and for that purpose adapted to have the iron enclosed therein while still heated and to sufficiently insulate the same so that after use of the iron it may be put away in the container without waiting for it to become cooled, said container being also adapted to serve as a stand for resting the iron while hot, momentarily, in the intervals of operating therewith. It consists in the elements and features of construction shown and described as indicated in the claims.

In the drawings:—

Figure 4 is a view similar to Figure 3 showing the container open and the position of the iron indicated therein as in the momentary intervals of ironing employing the container as a stand for the hot iron.

Figure 5 is a perspective view of the case shown at open position on a shelf as when exposed for display and sale.

Figure 6 is a section at the line, 6—6, on Figure 4.

Figure 7 is a view similar to Figure 6 showing a different form of cable storing pocket and showing also the iron in full line in the case at closed position of the latter.

Figure 8 is a section at the line, 8—8, on Figure 7.

Figure 9 is a detail section taken at a transverse vertical plane through the latching hook in the closed position of the container illustrated in Figure 1.

Figure 1:
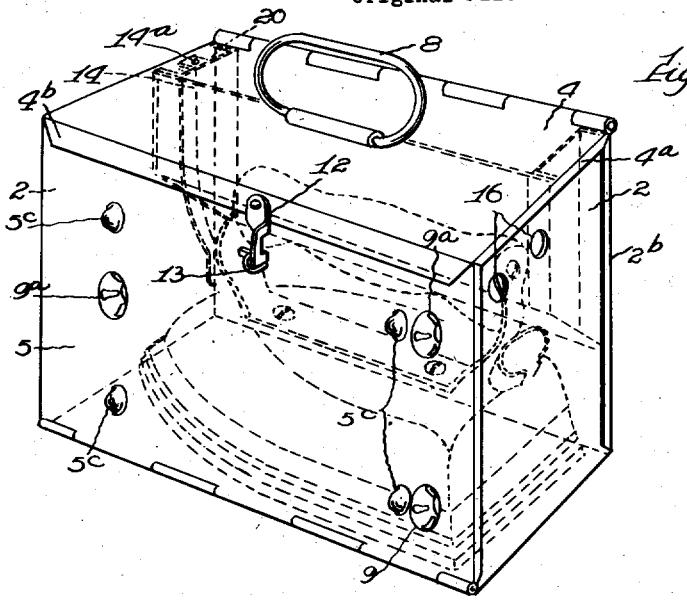
Figure 1 is a perspective view of a container embodying this invention, the same being shown closed with the iron indicated in dotted line therein.
Figure 2:
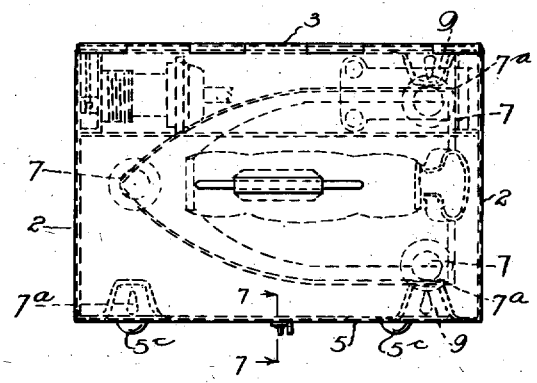
Figure 2 is a top plan view of the same.
Figure 3:
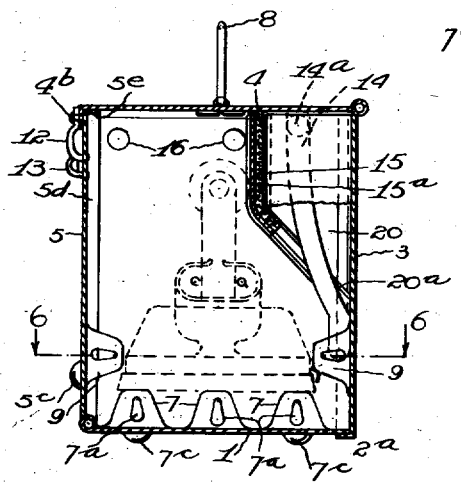
Figure 3 is a vertical transverse section through the container closed.
Figure 10:
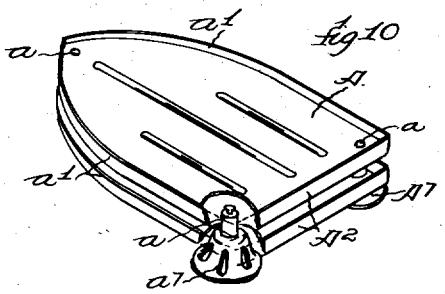
Figure 10 is a perspective view of a stand designed for enclosure with the iron for storage and shipment.

The container shown in the drawings is adapted and designed to be made of sheet metal stampings having the permanently united parts secured together by electric welding at their lappings. The device is substantially rectangular comprising bottom, 1, ends, 2, 2, and back, 3, permanently united rigidly at their respective corners.

In the construction shown, the bottom, 1, and the ends, 2, 2, are made in one piece and folded at right angles to form the end bottom corners of the container, and the back, 3, is made in a separate piece folded to form flanges, $2^a$, $2^b$, $2^b$, at the bottom and vertical end edges for lapping and welding outside the bottom, 1, and ends, 2, 2, respectively. The top, 4, is hinged at its rear edge to the upper edge of the back, 3. The forward side or front door, 5, is hinged at its lower edge to the forward edge of the bottom, 1, and the said top and front side are constructed for locking engagement with each other as hereinafter described at their meeting edges at the forward side of the top and upper side of the front. The bottom, 1, is provided with supports or rests, 7, for the iron, two near one end for the heel, and a third near the other end for the toe of the iron. These rests are preferably bosses struck up from the bottom and laterally apertured as shown at $7^a$ for ventilation of said rests and through the rests, of the container when it is closed with the hot iron in it, for which latter purpose the case has ventilating apertures at the upper part, as for example, in the ends as indicated at 16, 16. The container is designed to be carried with the iron in it by means of a handle, 8, secured to the top, 4; and desirably the weight of the container and contents should be balanced under the position of the handle. For positioning the iron in the container for so balancing the weight, the container is dimensioned as to width and length so as to allow minimum play or waste area around the iron; but some space must be allowed to permit the easy introduction and removal of the iron, and with such allowance the shifting of the position of the iron which would be possible in the absence of limiting means, would be sufficient to render the device unbalanced with respect to the handle, and for this purpose,—that is, to center the iron under the handle,—there are provided projecting from the rear wall, 3, and from the front wall or door, 5, stops, 9, 9, identical in form with the rests, 7, and positioned for stopping laterally the body of the iron when it is lodged upon the rests, 7.

For convenience of affording rests for the iron outside the container instead of within it, or in addition to the provision for resting it within the container in the momentary intervals of use, the front door, 5, has in addition to the stop, 9, identical devices, $9^a$, $9^a$, the three elements, 9, $9^a$, $9^a$, being arranged on the front door similarly to the arrangement of the three rests, 7, on the bottom, so that when the front door is folded down to open position and thereby lodged upon the user's ironing table or stand, the iron may be momentarily rested upon the open door, if this is found more convenient than to lodge it upon the bottom of the container.

The bottom, 1, has struck downward from it near the four corners, bosses, $7^c$, for spacing the container slightly from the table on which it may stand, to avoid burning the table by the heat of the iron lodged upon the rests, 7, and similarly the front door, 5, has outstruck bosses, $5^c$, for spacing the door away from the table onto which it is swung at open position.

For rendering the container as stiff as possible at closed condition of the cover and front door, and adapting these members to thus stiffen the container, the cover, 4, has its ends and forward edge flanged downwardly, said flanges, $4^a$, at the ends lapping outside the ends, 2, 2, of the container, and the flange, $4^b$, at the forward edge of the cover lapping outside the upper edge of the front side of door, 5, when the latter is swung up to closed position. The order of closing, therefore, is, first, to swing up the front door, and then to swing down the top cover, bringing its forward flange, $4^b$, outside the front door. The front door has its ends and upper edge similarly flanged, the end flanges, $5^d$, lapping outside the ends, 2, 2, of the container and its upper edge flange, $5^e$, folded at an acute angle to the inner surface of the said front door and thereby extending inside the cover when the latter is closed with its own front flange, $4^b$, engaging outside said front door. Inasmuch as it is designed that the container shall be carried with its contents by the handle at the top, it is necessary to engage the top with the front door in a manner to resist vertical separation of the two parts at their meeting edges. This is most readily effected by means of a hook, 12, pivoted on the forward flange, $4^b$, of the top and engaging a staple, 13, which projects outwardly from the forward side of the front door, 5.

A specific purpose for which this container is designed is, to accommodate in it, both for shipment and in intervals of use, the electric cable through which the iron is energized, which is detachable from the iron as well as from the socket in the electric circuit by which the iron is energized, and which has proper terminals for these connections. It is important to avoid coiling the cable around the iron for storing it with the iron when the latter is hot after use; and at the same time it is desirable to be able to store the cable with the iron. For this purpose there is provided in the container at the back and upper part a pocket which extends to within a short distance of each end (space being left between the ends of the pocket and the end walls for a check, 14, which may be used at either or both ends shown only at the left hand end for checking the cover at open, rearwardly inclined position, as seen in Figures 4 and 5, and hereinafter more particularly explained). This pocket is made adequate to accommodate a cable of the length with which the irons are customarily equipped. It is then formed by means of a sheet metal partition, 15, for welding to the ends and back of the container. If desired, this partition may be made hollow by folding the metal sheet double, with space between the folds which may contain a sheet of asbestos or the like, $15^a$. The partition, 15, is located a little rearward from the position of the handle of the iron when the latter is lodged on the rests, 7, and stopped between the stops, 9; so that the iron carried by its handle may be placed in and removed from the container without hindrance by reason of the partition; and for the same purposes,—to permit the easy introduction of the iron by the natural oblique movement downward and inward, or, upward and outward for removal,—the bottom of the pocket is sloped as shown, down rearwardly from the vertical forward position of the partition to the back wall of the container.

The check, 14, is desirably formed of the shape shown to adapt it in the closing of the cover, to pass down behind the partition wall which forms the front side of the cable pocket and in a pocket, 20, formed for the check between the end wall of the case and the partition, $20^b$, which forms the end of the cable pocket. Said check is pivoted at its upper end to the under side of the cover, as seen at $14^a$, and for the stopping of the cover at the proper rearwardly inclined position, the check fulcrums over the hinge of the cover to the rear wall, as seen at $14^c$, and at its lower free end it is stopped on the wall of the check pocket, 20, this stoppage in the form shown in the principal figures being by means of a slot, $20^a$, at the bottom of the check pocket, the forward end of which is encountered by the check at the position to which the check is rocked over its fulcrum on the hinge at the proper rearwardly-inclined position of the cover. At the closed position of the cover the check hangs down freely through said slot in the bottom of the check pocket in the position shown in Figure 8 (which figure, however, represents a different form of pocket, but shows the same form of check and its location at closed position).

In Figures 7 and 8 there is shown a cable-storing pocket, 14x, in a different position utilizing otherwise unoccupied space in the rectangular space containing an iron of the customary taper-nosed form. In these figures the pocket is vertical instead of horizontal and extends from top to bottom of the case at the back left hand end corner,—that is, behind the position of the forward tapered end of the iron when the latter is stored in the case. With a pocket of this form there is also formed a check pocket, 20, which, however, need not have any slotted bottom, the end of the check being stopped upon the forward wall of the check pocket, as shown in dotted line in Figure 8.

In conjunction with this container, to be stored with the iron therein, and to be used instead of lodging the iron on the rests, 7, 7, 7, or on the corresponding rests formed on the front member when at open position, I have provided a stand $AA^2$, which is designed and adapted to be positioned on the ironing table independently of the container, and also adapted to be placed in the container with the iron when the same is stored out of use or for shipment or display on sale. This stand comprises two plates, A, $A^2$, which are spaced apart and secured together by spacing studs, *a*, shouldered and riveted into the plates at their upper and lower ends, respectively. The lower plate has hollow die-cut and stamped legs, $A^7$, dimensioned to fit over the bosses, 7, of the container bottom, or on the corresponding bosses of the front door, 5, and thereby to position the stand, A, either in the container when it is closed or when it is in service. Both plates are marginally flanged upward as seen at $a^1$ to stiffen the plates, and as to the upper plate, to locate and retain the iron on the stand safe against slipping. The container is vertically dimensioned to accommodate the stand, A, with the iron thereon; and when the stand is thus placed in the container, it dispenses with the function of the bosses, 9 and 5, for centering the iron in the container. The stamped legs, $A^7$, of the stand are apertured as seen at $a^7$, for ventilating, similar to the bosses, 7, of the container bottom, the corresponding apertures, $7^a$ and $a^7$, of the two sets of bosses coinciding when the stand is in position on the bottom of the container so that ventilation occurs through both sets of bosses. It will be understood that the employment of two plates, A and $A^2$, in the stand is for the purpose of ventilating under the bottom of the iron and so preventing the lower plate, and whose foot may rest directly on the ironing board or on the fabric covering thereof and whose under surface is slightly spaced from the support from becoming so hot as to burn the board or the cloth.

I claim:—

1. A container and stand for an electric iron consisting of a case which is openable forwardly and upwardly for entrance and exit of the iron, said case having mounted at the back and upper part of the container, and extending down behind the position of the handle of the iron, an upwardly open pocket dimensioned for storing the detachable electric cable of the iron.

2. A container for an electric iron having hinged top and forward side adapted to open respectively upwardly and downwardly to permit the insertion and removal of the iron by combined vertical and horizontal movements, said case being horizontally dimensioned to accommodate the iron substantially without waste area on the bottom; means for positioning the iron approximately centrally of the width of the bottom of the case consisting of stops projecting substantially at the plane of the body of the iron from the back wall and front wall respectively.

3. A container for an electric iron and its cable having hinged top and forward side adapted to open respectively upward and downward to permit the insertion and removal of the iron by the combined vertical and horizontal movement, said case being horizontally dimensioned to accommodate the iron substantially without waste area on the bottom, and a pocket for the cable formed by a partition mounted at the back and upper part of the container spaced rearward of the position of the handle of the iron, and terminating downwardly at a distance above the body of the iron sufficient to permit the entrance and removal of the iron by rocking it over its forward bottom edge.

4. A container for an electric iron and its cable having hinged top and forward side, and thereby adapted to be opened forwardly and upwardly for insertion and removal of the iron; rests for the iron on the bottom of the container and a pocket at the upper rear part of the case for the electric cable, said pocket having its forward side extending at a position sufficiently rearward of the position of the handle of the iron when lodged upon the rests to clear the hand of the operator grasping said handle, and its bottom extending above the body of the iron at a sufficient distance to permit the latter to be tilted over the forward rest in entering and removing the iron.

5. A container for an electric iron having its forward side hinged at the lower edge to form a door openable by swinging downward and outward, said door having bosses projecting inwardly therefrom at closed position and upwardly therefrom at open position, adapted to constitute rests for the iron in the intervals of its use.

6. A container for an electric iron having the bottom provided with projections constituting rests for the iron, and the front and rear wall provided with similar projections constituting lateral stops for the iron when lodged upon said bottom rests; the front wall being hinged at its lower edge to constitute a door adapted to be swung to horizontal position for opening, said door having projections similar and additional to the one which stops the iron horizontally at closed position and arranged to serve as rests for the iron at open position.

7. A container and stand for an electric iron adapted to receive the iron lodged while hot on the bottom of the container during the intervals of use, said container bottom having ventilated rests for upholding the iron from the surface of said container bottom.

8. A container for an electric iron adapted to receive and enclose the same for storage while hot after a period of use, said container being apertured at the upper part for ventilation to facilitate the cooling of the iron, the bottom of the container having rests for lodgement of the iron, said rests being hollow, and the bottom of the container being perforated under the rests, and said rests being perforated for co-operating for ventilation with the apertures at the upper part of the container.

9. A container for an electric iron and its cable having forward side and top hinged and thereby adapted to be opened forwardly and upwardly for insertion and removal of the iron, said container having a pocket for storing the electric cable at the rear part thereof, a check for checking the cover at open position, inclined rearwardly upward; a pocket in the container at one end thereof, formed between the end wall and the adjacent end of the cable pocket for accommodating said check.

10. A container for an electric iron and its cable having forward side and top hinged and thereby adapted to be opened forwardly and upwardly for insertion and removal of the iron, said container having a pocket for storing the electric cable at the rear part thereof, a check for checking the cover at open position, inclined rearwardly upward; a pocket in the container at one end thereof, formed between the end wall and the adjacent end of the cable pocket for accommodating said check, said check being fulcrumed over the cover hinge and checked at its free end on the wall of the check pocket for holding the cover at said open position.

In testimony whereof, I have hereunto set my hand at Chicago, Illinois, this 8th day of September, 1926.

MICHAEL W. McARDLE.